United States Patent
Konishi

(10) Patent No.: US 7,626,781 B2
(45) Date of Patent: Dec. 1, 2009

(54) DATA RECORDING DEVICE

(75) Inventor: Takashi Konishi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/009,077

(22) Filed: Jan. 15, 2008

(65) Prior Publication Data
US 2008/0170322 A1    Jul. 17, 2008

(30) Foreign Application Priority Data
Jan. 15, 2007   (JP)   ............................ 2007-006255

(51) Int. Cl.
*G11B 5/596*   (2006.01)
(52) U.S. Cl. .................. 360/77.02; 360/77.04
(58) Field of Classification Search ........................ None
See application file for complete search history.

(56) References Cited

U.S. PATENT DOCUMENTS

| | | | |
|---|---|---|---|
| 5,325,247 A * | 6/1994 | Ehrlich et al. ............ | 360/78.09 |
| 6,417,982 B1 * | 7/2002 | Ottesen et al. ........... | 360/77.02 |
| 6,549,349 B2 * | 4/2003 | Sri-Jayantha et al. ......... | 360/31 |
| 6,765,749 B2 * | 7/2004 | Galloway et al. ......... | 360/78.04 |
| 6,853,512 B2 | 2/2005 | Ozawa | |
| 7,268,968 B2 * | 9/2007 | Semba et al. ............ | 360/77.02 |
| 7,466,507 B2 * | 12/2008 | Fulkerson et al. ............. | 360/31 |

OTHER PUBLICATIONS

Kisaka "Frequency Chasing Peak Filter," Papers of Technical Meeting on Industrial Instrumentation and Control, IEE Japan IIC-04:19-23(2004), abstract only.

* cited by examiner

*Primary Examiner*—K. Wong
(74) *Attorney, Agent, or Firm*—Townsend and Townsend and Crew LLP; Patrick Duncan

(57) ABSTRACT

Embodiments of the present invention provide a data recording device capable of achieving desired performance while increasing the convergence rate. According to one embodiment, in a data recording device, an update-width determination unit included in a setting updating unit determines an update-width of a set frequency f in a digital filter according to the size of a position error signal PES, and an update-width adjuster included in the setting updating unit changes the update-width of the set frequency f determined by the update-width determination unit according to the size of the set frequency f. Thus, while the convergence rate being kept properly, the set frequency f can precisely be converged on a frequency of a disturbance component.

2 Claims, 5 Drawing Sheets

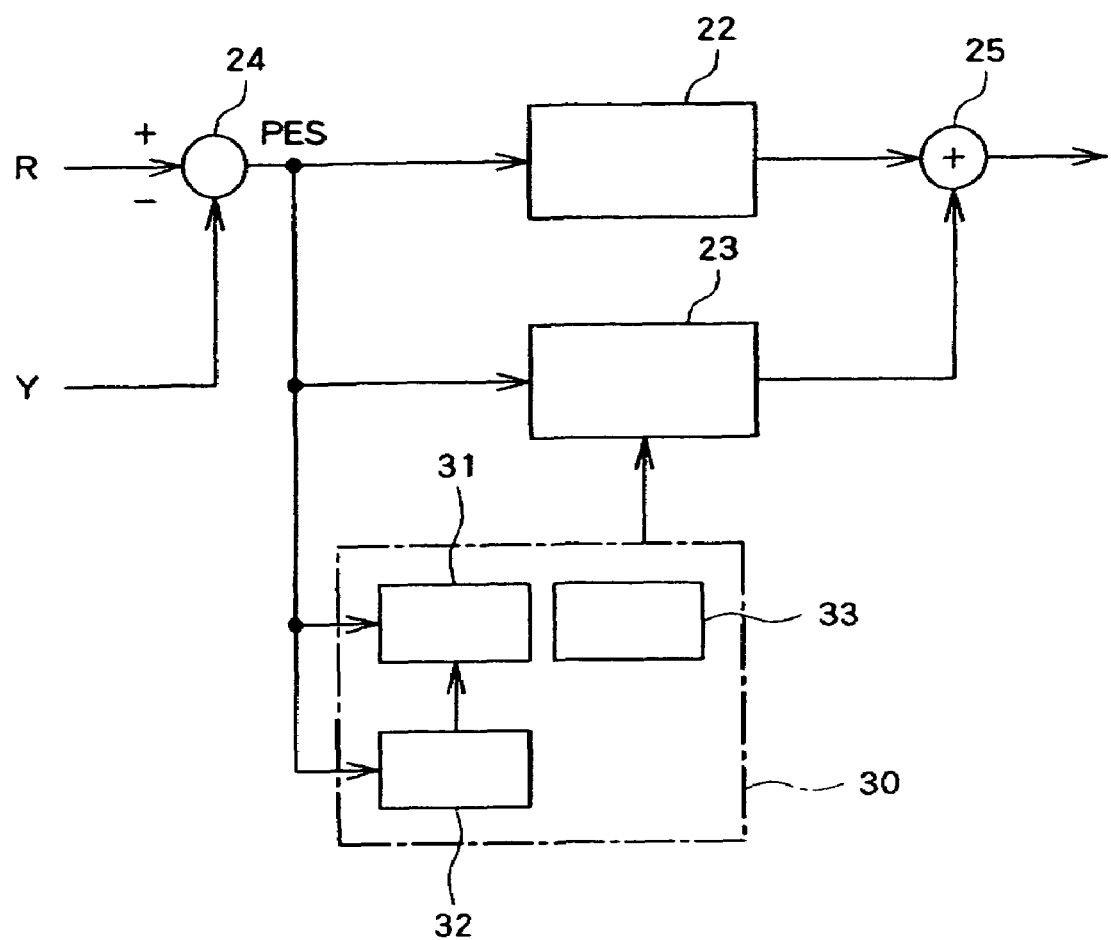

| Set frequency of filter | Weighting coefficient |
|---|---|
| 50~100(Hz) | 1 |
| ~200(Hz) | 1 |
| ~200(Hz) | 1/2 |
| ~400(Hz) | 1/2 |
| ~500(Hz) | 1/4 |
| ~600(Hz) | 1/4 |
| ~700(Hz) | 1/8 |
| ~800(Hz) | 1/8 |
| ~900(Hz) | 1/16 |
| ~1000(Hz) | 1/16 |

DATA RECORDING DEVICE

CROSS-REFERENCE TO RELATED APPLICATION

The instant nonprovisional patent application claims priority to Japanese Patent Application No. 2007-006255 filed Jan. 15, 2007 and which is incorporated by reference in its entirety herein for all purposes.

BACKGROUND OF THE INVENTION

In a data recording device, such as a hard disk drive, data is written to circular tracks formed on a disk which is a magnetic recording medium. Therefore, in order to write or read the data, positioning control is necessary for moving a magnetic head to a position on the track. In such a head-positioning mechanism, there are various kinds of measures taken against periodic disturbance caused by various factors.

However, the above disturbance includes, for instance, vibration given to the magnetic disk device whose frequency is hard to specify in advance or the one whose frequency changes with the passage of time. On the other hand, the follow-up control for maintaining the position of the magnetic head relative to a target track is designed to suppress the disturbance in a wide range. As a result, there may be a case where its ability is not enough to suppress disturbance of a specific frequency component.

In recent years, data recording devices such as a hard disk drive have come to be used in various fields including those of portable computers, cellular phones, car-navigation systems, etc. Therefore, a technique to fully suppress the influence of external vibration is desirable.

Japanese Patent Publication No. 2003-109335 ("Patent Document 1") discloses a method wherein a resonant filter to remove a signal having a specific frequency component is used, and the resonant frequency of the resonant filter is repetitively updated to be gradually close to the frequency of the disturbance so as to remove the disturbance. Moreover, "Frequency Chasing Peak Filter", M. Kisaka, IEE of Japan Technical Meeting Record, No. IIC-04-70, pg. 19-23 (2004) ("Non-patent document 1") discloses a technique wherein, when the repetitive updating is performed, such an update-width is determined as the one whose minimum value is set to the square of the position error.

According to the method disclosed by Non-patent document 1, while a convergence rate is increased, a resonant frequency of the resonant filter can be made closer to a target frequency as compared to a case where the update-width is fixed, improving the capability of suppressing disturbance. According to the method disclosed in Non-patent document 1, however, depending on a frequency band to which the resonant frequency belongs, the convergence rate becomes excessively high, resulting in a conversion of the resonant frequency on a frequency away from the target frequency, etc., and desired performance may not be achieved.

BRIEF SUMMARY OF THE INVENTION

Embodiments of the present invention provide a data recording device capable of achieving desired performance while increasing the convergence rate. According to the particular embodiment disclosed in FIG. 2, in the data recording device, an update-width determination unit 31 included in a setting updating unit 30 determines an update-width of a set frequency f in a digital filter 23 according to the size of a position error signal PES, and an update-width adjuster 33 included in the setting updating unit 30 changes the update-width of the set frequency f determined by the update-width determination unit 31 according to the size of the set frequency f. Thus, while the convergence rate being kept properly, the set frequency f can precisely be converged on a frequency of a disturbance component.

BRIEF DESCRIPTION OF THE DRAWINGS

FIG. 2 is a functional block diagram showing how to position a head of the data recording device according to an embodiment of the present invention.

DETAILED DESCRIPTION OF THE INVENTION

Embodiments of the present invention relate to data recording devices such as a hard disk drive. Embodiments of the present invention are made in view of the above, and an object of embodiments in accordance with the present invention is to provide a data recording device capable of achieving the desired performance while increasing a convergence rate.

In order to solve the above problem, the data recording device of embodiments of the present invention comprises: a recording medium on which servo data is recorded; a head which reproduces the servo data from the recording medium, an actuator which moves the head relative to the recording medium; and a position-control circuit which produces, based on the servo data reproduced by the head, a position error signal representing a position error of the head relative to a target position and drives the actuator so that the head may be positioned at the target position. Also, the position-control circuit includes: an attenuator which attenuates signal components of a set frequency contained in the position error signal; an update-width determination unit which determines an update-width of the set frequency, for allowing the set frequency to follow a frequency of disturbance components contained in the position error signal, according to the size of the position error signal; an update-width adjuster which changes the determined update-width of the set frequency according to the size of the set frequency; and a setting updating unit which updates the set frequency of the attenuator according to the changed update-width of the set frequency.

In the data recording device of embodiments of the present invention, the larger the set frequency becomes, the smaller the update-width adjuster makes the update width of the set frequency.

Further, the data recording device of one embodiment comprises a memory storing therein a table containing the relationship between the size of the set frequency and weight assignment for changing the update-width of the set frequency, wherein the update-width adjuster refers to the contents of the table and changes the update-width of the set frequency.

With reference to drawings, embodiments of the present invention will be described.

In the embodiment below, a magnetic disk device, such as a hard disk drive, will be described as an example of the data recording device. However, the data recording device is not limited to the above, and it may be any other disk device.

Figure 1:
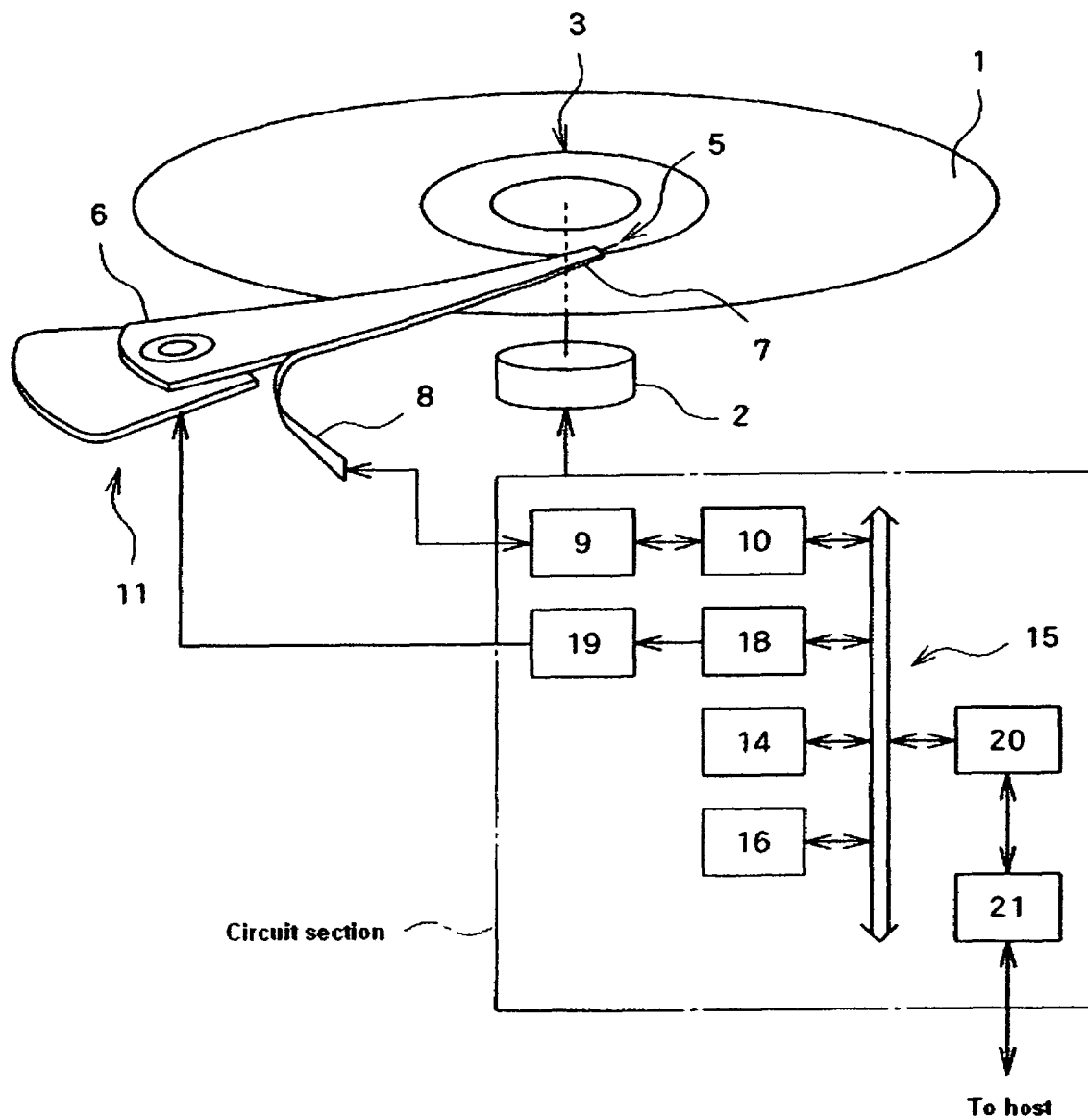
FIG. 1 is a schematic diagram showing an example of the construction of a data recording device according to an embodiment of the present embodiment.

FIG. 1 is a schematic diagram showing a configuration of a magnetic disk device. The magnetic disk device comprises: a magnetic disk medium 1 as a recording medium; a spindle motor (SPM) 2; a magnetic head 5; a carriage 6; a suspension 7; a flexible circuit 8; a head signal amplifier 9; a modulator/demodulator 10; a voice coil motor (VCM) 11 as an actuator; a microprocessor (MPU) 14; a memory 16; a digital-to-analogue converter (D/A converter) 18; a drive amplifier 19; an interface controller 20; and a host-side controller 21. Further, the D/A converter 18, the modulator/demodulator 10, MPU 14, memory 16, and interface controller 20 are mutually connected through a bus line 15.

The magnetic disk medium 1 is driven to rotate by the SPM 2. Two or more tracks 3 in the shape of concentric circles about a rotation axis are formed on a principal plane of the magnetic disk medium 1. User data are recorded on trajectories defined by the concentric tracks 3. Further, on each track 3, servo data for detecting a position of the magnetic head 5 is recorded.

The servo data includes track information, sector information, burst signals, etc. By the magnetic head 5 reading the servo data, for every sampling period defined by the rotation rate of the SPM 2 and the number of sectors per one track, a position of the magnetic head 5 on the magnetic disk medium 1 can be detected.

The magnetic head 5 is supported by the suspension 7 provided at the end of the carriage 6. A signal read from the magnetic disk medium 1 by the magnetic head 5 is outputted to the head signal amplifier 9 through the flexible circuit 8. Further, based on the signal inputted from the head signal amplifier 9 through the flexible circuit 8, the magnetic head 5 writes information to the magnetic disk medium.

The carriage 6 is driven by the VCM 11 to rotate about a pivot serving as an axis. Accordingly, the magnetic head 5 provided at the tip of the carriage 6 is moved relative to the magnetic disk medium 1, and writes and reads the data.

The head signal amplifier 9 amplifies the signal read by the magnetic head 5 and outputs it to the modulator/demodulator 10. Further, the head signal amplifier 9 amplifies the signal outputted by the modulator/demodulator 10 and outputs it to the magnetic head 5.

The modulator/demodulator 10 is provided with an analog-to-digital converter (A/D converter). The modulator/demodulator converts the signal outputted by the head signal amplifier 9 to a digital signal to demodulate it, and outputs the demodulated signal to the MPU 14. In addition, the modulator/demodulator 10 is provided with a digital-to-analogue converter (D/A converter). Therefore, the modulator/demodulator 10 modulates data to be written, which is outputted by the MPU 14, further converts it to an analog signal, and outputs it to the head signal amplifier 9.

The VCM 11 is controlled by a VCM drive signal inputted from the MPU 14. The MPU 14 moves, under the control of the VCM 11, the magnetic head 5 to a position on the track where data is written or read. Further, the MPU 14 controls the magnetic head 5 to follow the track. The VCM drive signal outputted by the MPU 14 is converted to an analog signal in the D/A converter 18, amplified by the drive amplifier 19, and outputted to the VCM 11.

The MPU 14 operates according to a program stored in the memory 16. The memory 16 comprises a RAM (Random Access Memory) and a ROM (Read Only Memory). The RAM serves as a work memory for the MPU 14. Also, the ROM stores programs etc. to be executed by the MPU 14. Moreover, there is stored in the memory 16 a table for changing an update-width of a set frequency to be described later.

As a specific example, the MPU 14 controls the VCM 11 according to an instruction to read and write inputted from a host, moves the magnetic head 5 to a desired track, and controls reading and writing of the data. The control by the VCM 11 will be described in detail later.

The interface controller 20 receives, from the MPU 14, the data read from the magnetic disk medium 1 and outputs it to the host-side controller 21. Further, the interface controller 20 outputs the data from the host-side controller 21, instructions to read or write, etc. to the MPU 14.

The host-side controller 21 is connected to host-side devices, such as a personal computer. The host-side controller 21 outputs the data outputted from the interface controller 20 to the host-side device. Further, the hose-side controller 21 outputs data inputted from the host-side device and instructions to the interface controller 20.

Now, how the MPU 14 as a position-control circuit controls the VCM 11 will be described. As shown in FIG. 2, the control of the VCM 11 exercised by the MPU 14 of the present embodiment involves, in terms of functions, a follow-up control compensator 22, a digital filter (attenuator) 23, a first adder 24, a second adder 25, and a setting updating unit 30. Further, the setting updating unit 30 comprises an update-width determination unit 31, an inverter 32, and an update-width adjuster 33.

When receiving an input of a position error signal PES which is a difference between a target position of the magnetic head 5 and a current position, the follow-up control compensator 22 suppresses position error components covering a relatively wide range and generates a control signal to stabilize the entire control system. As the follow-up control compensator 22, a circuit widely known as the one to suppress non-periodical components of the position error can be used. Therefore, the detailed description thereof will be omitted.

The first adder 24 subtracts a current position signal Y representing a detected current position of the magnetic head 5 from a target position signal R representing a specified target position of the magnetic head 5, and outputs the position error signal PES.

The second adder 25 adds an output signal of the follow-up control compensator 22 to a signal outputted by the digital filter 23, and outputs it as a VCM drive signal for controlling the position of the magnetic head 5. In this regard, the signal outputted by the follow-up control compensator 22 is a signal for moving the magnetic head 5 to a desired position. Further, the signal outputted by the digital filter 23 is a signal for canceling the effect of the disturbance to the tip of the magnetic head 5.

The digital filter 23 is constructed as a resonant filter (peak filter) to attenuate a signal component of a fixed frequency range around the set frequency. Of the inputted position error signal PES, the digital filter 23 amplifies the signal component of the set frequency and generates a signal of opposition and outputs it. This signal serves as a signal to provide a force, at the tip of the magnetic heads 5, for offsetting the disturbance (physical external force giving influence to the position of the tip of the magnetic head 5). In this regard, a transfer function of the digital filter 23 can be represented by the equation below.

$$Cpk = \frac{PZ^2 + QZ + R}{Z^2 - EZ - F} \quad \text{Equation 1}$$

In the above equation, Cpk denotes a signal outputted from the digital filter 23. Z denotes a signal outputted just before it from the digital filter 23 and is called a "state variable." $PZ^2+QZ+R$ being a numerator is a component which is unrelated to setting the set frequency, and is a component mainly for securing the stability of the control system. E in a denominator denotes a parameter for setting the set frequency and can be represented by the equation below.

$$E = 2\cos(2\pi fT) \quad \text{Equation 2}$$

In the above equation, f denotes a set frequency (peek frequency). Further, T denotes a sampling period. As seen from the equation, the parameter E may be made smaller than a case when shifting the set frequency f in the digital filter 23 to a higher range. Alternatively, the parameter E may be made larger when shifting the set frequency f to a lower range.

By changing the parameter E in the digital filter 23, the setting updating unit 30 updates the set frequency f.

Specifically, the update-width determination unit 31 included in the setting updating unit 30 determines sizes of the signals (frequencies of both signals) by comparing the phase of the position error signal PES with the phase of the signal outputted from the inverter 32. Further, the update-width determination unit 31 determines whether the direction in which the set frequency f is made to follow the frequency of the disturbance component contained in the position error signal PES is toward the low-range side or the high-range side. At the same time, the update-width determination unit 31 determines the update-width of the set frequency f in the direction for the set frequency f to follow.

In this regard, the inverter 32 is a circuit to perform the similar calculation as the digital filter 23 does, and outputs a signal made by inverting the outputs before and after the peek. Accordingly, in the update-width determination unit 31, comparison with the position error signal PES can easily be made. Further, instead of the signal outputted from the inverter 32, a signal outputted just before it from the digital filter 23 may be inputted to the update-width determination unit 31.

As shown in Patent document 1, the update-width determination unit 31 compares a phase of the position error signal PES with a phase of a signal outputted from the inverter 32. When the two phases match, since the position error signal PES has a frequency lower than a frequency of the outputted signal, it is determined that the set frequency f should be shifted to a higher range. On the other hand, when the phase difference is 180 degrees, the frequency of the position error signal PES is higher than the frequency of the outputted signal. Therefore, it is determined that the set frequency f should be shifted to the lower range. Thus, by determining a direction in which the set frequency f is shifted, the set frequency f is allowed to follow the frequency of the disturbance contained in the position error signal PES.

Further, as shown in Non-patent document 1, the update-width determination unit 31 determines the update-width of the set frequency f, which enables the set frequency f to follow the frequency of the disturbance contained in the position error signal PES according to the size of the position error signal PES. That is, the update-width is determined such that the positioning error is minimized. In this regard, the update-width of the set frequency f is made larger as the position error signal PES becomes larger.

The update-width adjuster 33 changes, in accordance with the size of the set frequency f, the update-width of the set frequency f determined in the update-width determination unit 31. By referring to the table stored in the memory 16, the update-width adjuster 33 changes the update-width of the set frequency f.

Figures 3A, 3B:
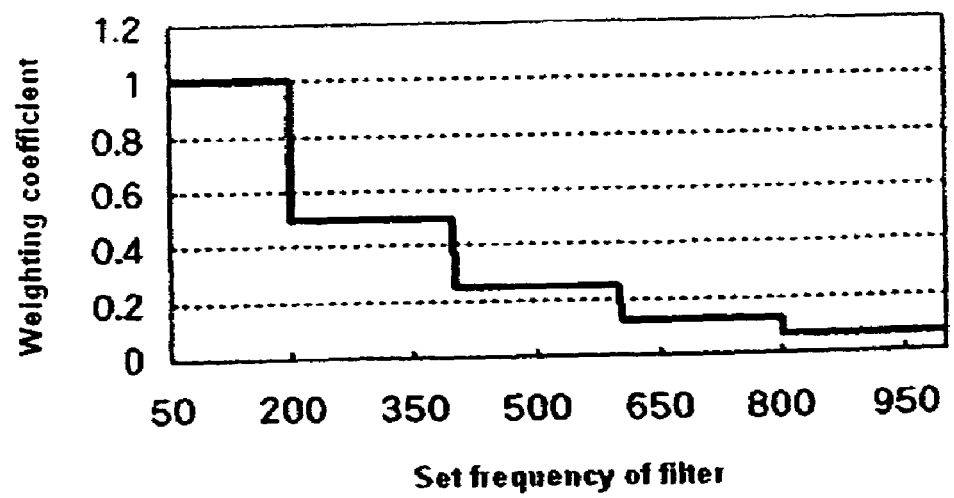
FIGS. 3(A) and 3(B) are illustrative diagrams showing a table for changing the update-width of a set frequency of the data recording device according to an embodiment of the present invention.

FIG. 3 shows an example of the contents of the table stored in the memory 16. Described in the table is the relation between the size of the set frequency f and the weighting coefficient for assigning weights to change the update-width of the set frequency f. According to the table, the weighting coefficient is set such that the update-width of the set frequency f is smaller as the set frequency gets higher. Also, the weighting coefficient is set for every predetermined band (every 100 Hz, for instance) of the set frequency f, and the weighting coefficient gradually decreases as the set frequency f gets higher.

The update-width adjuster 33 obtains a weighting coefficient corresponding to the set frequency f from the table stored in the memory 16. Further, the update-width adjuster 33 changes the update-width of the set frequency f by multiplying the update-width of the set frequency f determined in the update-width determination unit 31 by the weighting coefficient.

Thus, based on the update-width of the set frequency f changed by the update-width adjuster 33, the setting updating unit 30 changes a parameter E in the digital filter 23 so that the set frequency f may shift as much as the update-width changed by the update-width adjuster 33.

In the present embodiment described above, the update-width determination unit 31 determines the update-width of the set frequency f according to the size of the position error signal PES. Therefore, the rate of the set frequency f to converge on the frequency of the disturbance can be increased. In addition, the update-width adjuster 33 changes the update-width of the set frequency f determined by the update-width determination unit 31 according to the size of the set frequency f Therefore, the convergence rate can be maintained properly and the set frequency f can be converged on the frequency of the disturbance precisely.

In the digital filter 23, generally, because of the form of the transfer function, the convergence rate of the set frequency f tends to be excessively high when the frequency gets higher. However, in the present embodiment, the update-width adjuster 33 makes update-width of the set frequency f smaller as the set frequency f gets higher. Therefore, the convergence rate of the set frequency f can properly be maintained throughout the frequency and the set frequency f can be converged precisely on the frequency of the disturbance.

Thus, according to the present embodiment, while the convergence rate being increased, the disturbance components contained in the position error signal PES can be removed properly, achieving the desired performance.

Further, according to the present embodiment, the update-width adjuster 33 changes the update-width of the set frequency f by referring to the table stored in the memory 16. Therefore, the processing load of the MPU 14 can be reduced.

Described in the present embodiment is an example in which the update-width of the set frequency f is changed by the update-width adjuster 33 by referring to the table stored in the memory 16. However, embodiments of the present invention are not limited to this, and the update-width of the set frequency f may be change by the computation of the MPU 14.

Figure 4:
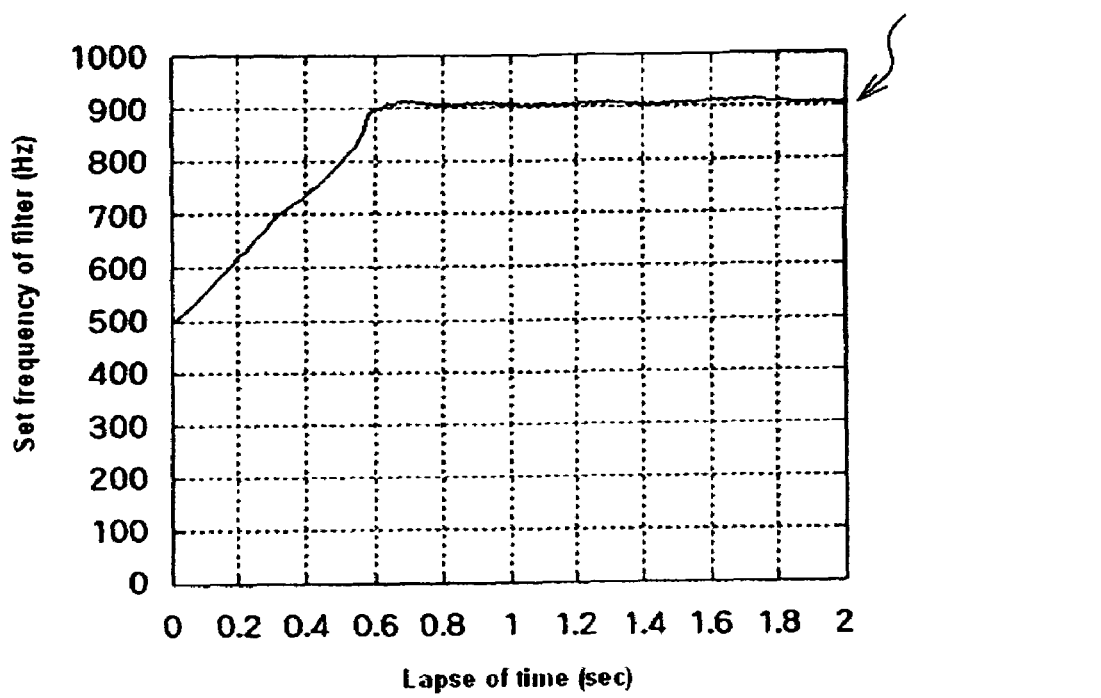
FIG. 4 is an illustrative diagram showing the operation of the data recording device according to an embodiment of the present invention.
Figure 5:
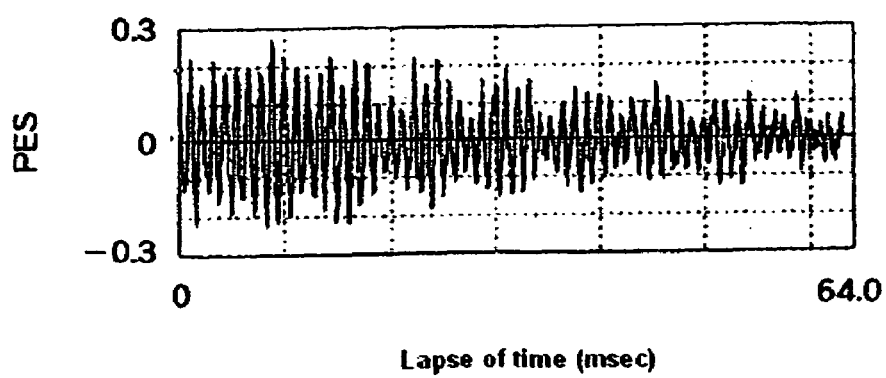
FIG. 5 is an illustrative diagram showing the operation of the data recording device according to an embodiment of the present invention.

In the magnetic disk device (Example) of the present embodiment constructed as above, an experiment in which disturbance whose frequency is 902 Hz is added will be described. FIG. 4 shows a result of the experiment by using the magnetic disk device of the present embodiment. FIG. 5 shows the position error signal varying with the lapse of time.

Figure 6:
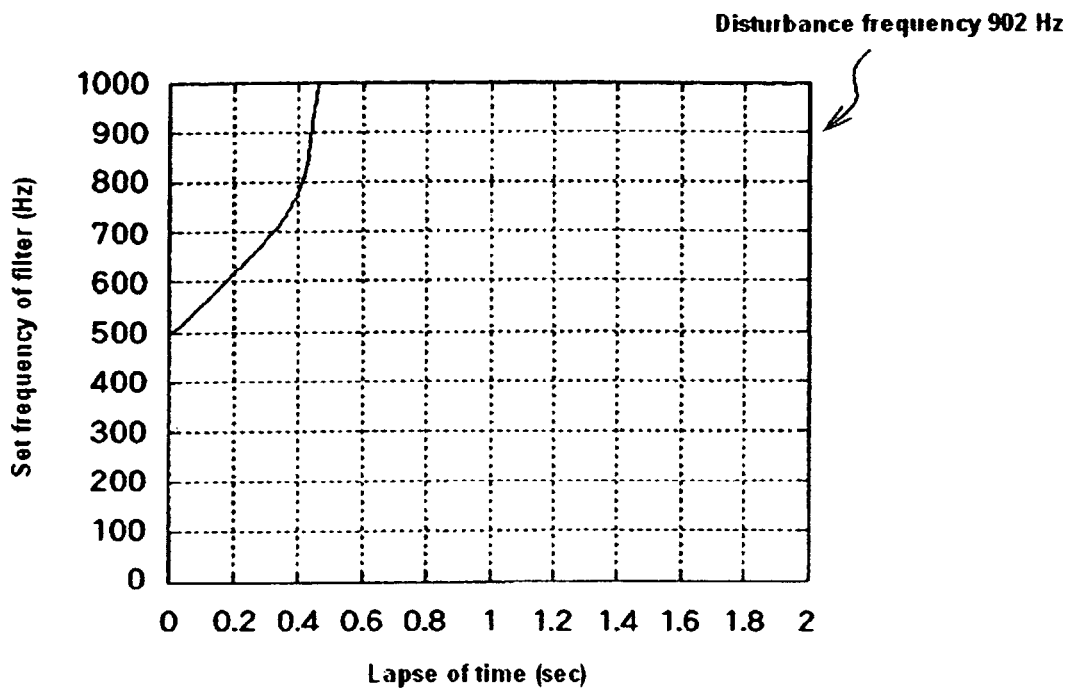
FIG. 6 is an illustrative diagram showing the operation of the data recording device according to a comparative example which does not have a construction of an embodiment of the present invention.

For comparison, in FIG. 6, without using the construction of the present embodiment as in Non-patent document 1, an example (Comparative example 1) is shown in which a method of determining the update-width of the set frequency in accordance with the size of the position error signal is adopted. Further, in FIG. 7, an example (Comparative example 2) is shown wherein update-widths of the set frequencies in Comparative example 1 are uniformly set to 0.25 times.

According to FIG. 4 showing the example, the set frequency of the digital filter converges on the frequency (902 Hz) of the disturbance at a relatively early stage (in about 0.6 seconds). Further, according to FIG. 5, the disturbance components contained in the position error signal are removed in about 0.6 seconds.

On the other hand, according to FIG. 6 showing Comparative example 1, the set frequency of the digital filter does not converge on the disturbance frequency (902 Hz). On the contrary, it is seen that set frequencies are dispersed around an upper limit of the frequency that can be set. In this case, the disturbance components contained in the position error signal cannot be removed.

Figure 7:
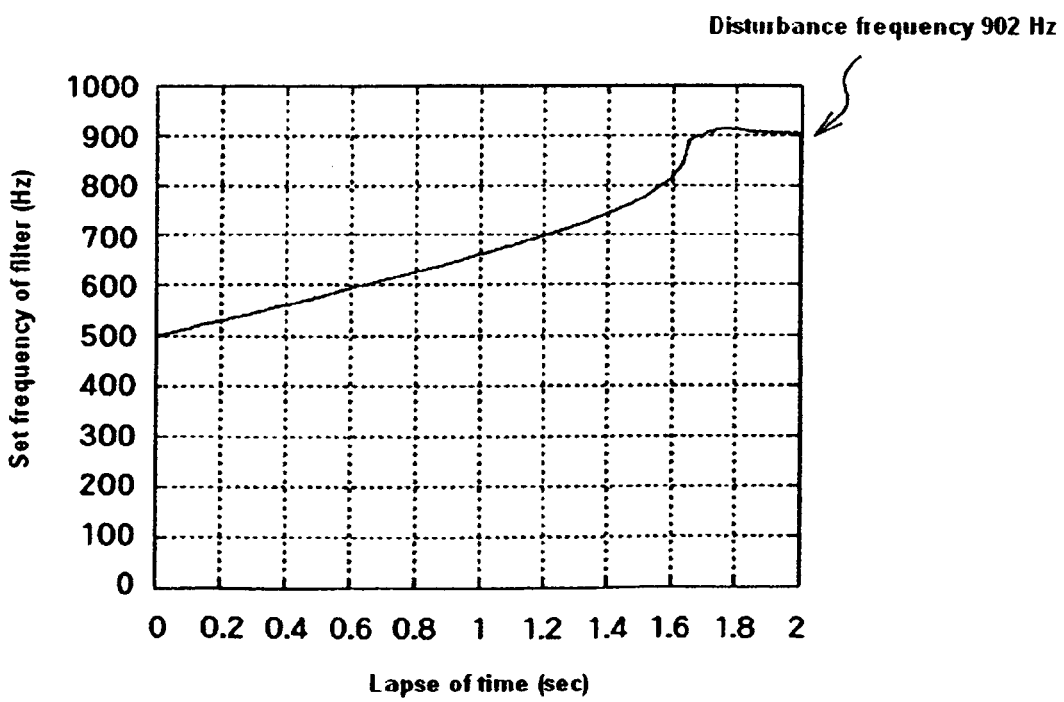
FIG. 7 is an illustrative diagram showing the operation of the data recording device according to a comparative example which does not have a construction of an embodiment of the present invention.

According to FIG. 7 showing Comparative example 2, the set frequency of the digital filter converges on the disturbance frequency (902 Hz). However, it takes about 1.8 seconds to converge, which is rather slow as compared with the example.

Thus, as compared with Comparative examples 1 and 2, in the present example, the frequency of the digital filter promptly converges on the disturbance frequency. At the same time, disturbance components contained in the position error signal can properly be removed.

What is claimed is:

1. A data recording device comprising:
a recording medium on which servo data is recorded;
a head which reproduces said servo data from said recording medium;
an actuator which moves said head relative to said recording medium; and
a position-control circuit which produces, based on the servo data reproduced by said head, a position error signal representing a position error of said head relative to a target position and drives said actuator so that said head may be positioned at said target position,
wherein said position-control circuit includes:
an attenuator which attenuates signal components of a set frequency contained in said position error signal;
an update-width determination unit which determines an update-width of said set frequency, for allowing said set frequency to follow a frequency of disturbance components contained in said position error signal, according to the size of said position error signal;
an update-width adjuster which changes the determined update-width of said set frequency according to the size of said set frequency; and
a setting updating unit which updates said set frequency of said attenuator according to the changed update-width of said set frequency,
wherein the larger said set frequency becomes, the smaller said update-width adjuster makes the update-width of said set frequency.

2. A data recording device according to claim 1 comprising a memory storing therein a table containing the relationship between the size of said set frequency and weight assignment for changing the update-width of set frequency,
wherein said update-width adjuster refers to the contents of said table and changes the update-width of said set frequency.

* * * * *